(12) United States Patent
Gao et al.

(10) Patent No.: US 11,992,959 B1
(45) Date of Patent: May 28, 2024

(54) KINEMATICS-FREE HAND-EYE CALIBRATION METHOD AND SYSTEM

(71) Applicant: GUANGDONG UNIVERSITY OF TECHNOLOGY, Guangzhou (CN)

(72) Inventors: Jian Gao, Guangzhou (CN); Guoqing Wu, Guangzhou (CN); Zhuojun Zheng, Guangzhou (CN); Lanyu Zhang, Guangzhou (CN); Yuheng Luo, Guangzhou (CN); Disai Chen, Guangzhou (CN); Xin Chen, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 18/402,139

(22) Filed: Jan. 2, 2024

Related U.S. Application Data

(63) Continuation of application No. PCT/CN2023/122591, filed on Sep. 28, 2023.

(30) Foreign Application Priority Data

Apr. 3, 2023 (CN) .......................... 202310345999.2

(51) Int. Cl.
  *B25J 9/16* (2006.01)
  *G06T 7/70* (2017.01)

(52) U.S. Cl.
  CPC ............... *B25J 9/1692* (2013.01); *G06T 7/70* (2017.01); *G06T 2207/30244* (2013.01)

(58) Field of Classification Search
  CPC . B25J 9/1692; G06T 7/70; G06T 2207/30244
  See application file for complete search history.

(56) References Cited

U.S. PATENT DOCUMENTS

| 2019/0015988 A1* | 1/2019 | Inazumi | ................. B25J 9/1697 |
| 2019/0015989 A1 | 1/2019 | Inazumi et al. | |
| 2022/0250248 A1 | 8/2022 | He et al. | |

FOREIGN PATENT DOCUMENTS

| CN | 105716525 A | 6/2016 |
| CN | 108818536 A | 11/2018 |

(Continued)

OTHER PUBLICATIONS

Internation Search Report of PCT/CN2023/122591, Mailed Oct. 24, 2023.

(Continued)

*Primary Examiner* — Basil T. Jos

(57) ABSTRACT

A kinematics-free hand-eye calibration method comprises: controlling translation axes of a five-axis motion platform to perform a single-axis point location motion, using a camera to obtain a first spatial coordinate of a calibration plate, fitting all first spatial coordinates into a spatial straight line to obtain a unit direction vectors of the spatial straight line, carrying out Schmidt orthogonalization on the unit direction vectors of the spatial straight lines of an X direction, a Y direction and a Z direction to obtain a pose relationship matrix combined by the orthogonalized direction vectors; obtaining a second spatial coordinate of the calibration plate in a mode of rotating an X-axis and a C-axis, fitting all second spatial coordinates into a spatial spherical surface, calculating a spherical center coordinate to obtain a position relationship matrix, and obtaining a hand-eye relationship matrix combined by the pose relationship matrix and the position relationship matrix.

10 Claims, 7 Drawing Sheets

FIG. 1B

(56) References Cited

FOREIGN PATENT DOCUMENTS

| | | | |
|---|---|---|---|
| CN | 108972544 | A | 12/2018 |
| CN | 108994844 | A | 12/2018 |
| CN | 110103217 | A | 8/2019 |
| CN | 111633643 | A | 9/2020 |
| CN | 113362396 | A | 9/2021 |
| WO | 2022160760 | A1 | 8/2022 |
| WO | 2022160761 | A1 | 8/2022 |

OTHER PUBLICATIONS

Qiansheng Wu, "3D Visual Guidance and Alignment System for Flexible Assembly of Mobile Phone Frame Screw Holes", China Master's Theses Full-text Database (Issue 1), pp. 1-95.

* cited by examiner

KINEMATICS-FREE HAND-EYE CALIBRATION METHOD AND SYSTEM

CROSS-REFERENCE TO RELATED APPLICATIONS

This application is a continuation of International Patent Application No. PCT/CN2023/122591 with a filing date of Sep. 28, 2023, designating the United States, now pending, and further claims priority to Chinese Patent Application No. 202310345999.2 with a filing date of Apr. 3, 2023. The content of the aforementioned applications, including any intervening amendments thereto, are incorporated herein by reference.

TECHNICAL FIELD

The present invention relates to the technical field of robot hand-eye calibration, and in particular to a kinematics-free hand-eye calibration method and system.

BACKGROUND OF THE PRESENT INVENTION

With the development of science and technology, a multi-degree-of-freedom precision motion platform has been widely used in industrial production, and it is of great significance to use a visual method to estimate position and pose in production to help a motion platform achieve accurate target grasping or processing.

The robot hand-eye calibration is a very basic and key technology to estimate the position and pose by a visual method to help the motion platform achieve the accurate target grasping or processing. In brief, the purpose of hand-eye calibration is to obtain a relationship between a motion platform coordinate system and a camera coordinate system, so as to transfer a result of visual recognition to the motion platform coordinate system. The hand-eye calibration may be divided into two categories according to an installation mode of the camera: hand-eye calibration with eyes outside a hand and hand-eye calibration with eyes in a hand. The existing hand-eye calibration method is to use a calibration plate to perform the hand-eye calibration by solving a high-dimensional nonlinear matrix equation in a form of AX=BX. In the matrix equation, both A and B are both known quantities, which are a pose matrix of a calibration plate coordinate system measured by the camera in the camera coordinate system and a platform end position-pose matrix calculated by a platform kinematics model (that is, a mathematical model describing the relative motion relationship between a tool and a workpiece in a manufacturing process of the platform), and X is the hand-eye relationship matrix to be solved. However, it is difficult to eliminate the error between the theoretical platform end position-pose matrix calculated by the platform kinematics model and the actual platform end position-pose matrix, especially in the case of large error, it is impossible to accurately solve the hand-eye relationship matrix, resulting in an inaccurate hand-eye calibration result. Therefore, the present invention provides a kinematics-free hand-eye calibration method, aiming at the hand-eye calibration with eyes outside the hand, which is used for solving a technical problem that the hand-eye calibration result is inaccurate because the error between the theoretical platform end position-pose matrix calculated by the platform kinematics model and the actual platform end position-pose matrix is difficult to eliminate, especially in the case of large error, it is impossible to accurately solve the hand-eye relationship matrix.

SUMMARY OF THE PRESENT INVENTION

The embodiments of the present invention provide a kinematics-free hand-eye calibration method and system, which are used for solving a technical problem that a hand-eye calibration result is inaccurate due to an error between a theoretical platform end position-pose matrix calculated by a platform kinematics model and an actual platform end position-pose matrix in a hand-eye calibration mode with eyes outside a hand.

For this purpose, a first aspect of the present invention provides a kinematics-free hand-eye calibration method, comprising the following steps of:

S1: building a hand-eye calibration platform with eyes outside a hand based on a five-axis motion platform;

S2: controlling one of translation axes of the five-axis motion platform to perform a single-axis point location motion, wherein the translation axes of the controlled five-axis motion platform comprising an X-axis, a Y-axis and a Z-axis;

S3: collecting a first spatial coordinate of a calibration plate in a process of controlling the five-axis motion platform to perform the single-axis point location motion by a camera;

S4: after the collected first spatial coordinate reaching a first preset number, fitting all the first spatial coordinates into a spatial straight line;

S5: judging whether distances of all the first spatial coordinates deviating from the spatial straight line being within a first maximum deviation distance range, if so, obtaining a unit direction vector of the spatial straight line according to a spatial straight line equation, if not, eliminating the first spatial coordinate with the largest deviation distance and returning to step S4;

S6: judging whether the single-axis point location motion of all translation axes of the five-axis motion platform having been completed, if not, controlling the five-axis motion platform to perform the single-axis point location motion on the next translation axis and returning to step S3, if so, executing step S7;

S7: carrying out Schmidt orthogonalization on the unit direction vectors of the spatial straight lines of the X-axis, the Y-axis and the Z-axis to obtain a pose relationship matrix combined by the orthogonalized direction vectors;

S8: controlling the five-axis motion platform to reset;

S9: deflecting an A-axis of the five-axis motion platform at a preset angle, deflecting a C-axis of the five-axis motion platform for a plurality of times, and recording a second spatial coordinate of the corresponding calibration plate when deflecting the C-axis each time;

S10: after the collected second spatial coordinates reaching a second preset number, fitting all the second spatial coordinates into a spatial spherical surface;

S11: judging whether distances of all the second spatial coordinates deviating from the spatial spherical surface being within a second maximum deviation distance range, if so, calculating a spherical center coordinate of the spatial spherical surface to obtain a position relationship matrix, if not, eliminating the second spatial coordinate with the largest deviation distance and returning to step S10; and S12: obtaining a hand-eye relationship matrix according to the pose relationship matrix and the position relationship matrix.

Optionally, the step S9 specifically comprises:

deflecting the A-axis of the five-axis motion platform at the preset angle, and judging whether the calibration plate being within a visual field of the camera, if so, deflecting the C-axis of the five-axis motion platform for the plurality of times, and recording the second spatial coordinate of the corresponding calibration plate when deflecting the C-axis each time, if not, controlling the five-axis motion platform to perform a translation motion, moving the calibration plate back to the visual field of the camera, and calculating the second spatial coordinates of the calibration plate before moving according to a motion amount of the translation motion and the direction vectors of each translation axis.

Optionally, the step S10 specifically comprises:

judging whether the number of the second spatial coordinates reaching the second preset number, if not, returning to the step S9, and if so, fitting all the second spatial coordinates into the spatial spherical surface.

Optionally, the step S4 specifically comprises:

judging whether the number of the first spatial coordinate reaching the first preset number, if not, returning to step S3, if so, fitting all the first spatial coordinates into the spatial straight line.

Optionally, the hand-eye relationship matrix is $$M_{4\times 4} = \begin{bmatrix} R_{3\times 3} & T_{3\times 1} \\ 0 & 1 \end{bmatrix}$$

wherein $M_{4\times 4}$ is the hand-eye relationship matrix, $R_{3\times 3}$ is the pose relationship matrix, and $T_{3\times 1}$ is the position relationship matrix.

Optionally, in the step S4, a least square method is used to fit all the first spatial coordinates into the spatial straight line, and in the step S10, the least square method is used to fit all the second spatial coordinates into the spatial spherical surface.

A second aspect of the present invention provides a kinematics-free hand-eye calibration system, comprises:

a platform building unit, used for building a hand-eye calibration platform with eyes outside a hand based on a five-axis motion platform;

a translation motion unit, used for controlling one of translation axes of the five-axis motion platform to perform a single-axis point location motion, wherein the translation axes of the controlled five-axis motion platform comprising an X-axis, a Y-axis and a Z-axis;

a first point collecting unit, used for collecting a first spatial coordinate of a calibration plate in a process of controlling the five-axis motion platform to perform the single-axis point location motion by a camera;

a first fitting unit, used for fitting all the first spatial coordinates into a spatial straight line after the collected first spatial coordinate reaching a first preset number;

a first distance judging unit, used for judging whether distances of all the first spatial coordinates deviating from the spatial straight line being within a first maximum deviation distance range, if so, obtaining a unit direction vector of the spatial straight line according to a spatial straight line equation, if not, eliminating the first spatial coordinate with the largest deviation distance and returning to perform the first fitting unit;

a translation shaft judging unit, used for judging whether the single-axis point location motion of all translation axes of the five-axis motion platform having been completed, if not, controlling the five-axis motion platform to perform the single-axis point location motion on the next translation axis, and returning to perform the first point collecting unit, if so, executing an orthogonalization unit;

the orthogonalization unit, used for carrying out Schmidt orthogonalization on the unit direction vectors of the spatial straight lines of the X-axis, the Y-axis and the Z-axis to obtain a pose relationship matrix combined by the orthogonalized direction vectors;

a resetting unit, used for controlling the five-axis motion platform to reset;

a second point collecting unit, used for deflecting an A-axis of the five-axis motion platform at a preset angle, deflecting a C-axis of the five-axis motion platform for a plurality of times, and recording a second spatial coordinate of the corresponding calibration plate when deflecting the C-axis each time;

a second fitting unit, used for fitting all the second spatial coordinates into a spatial spherical surface after the collected second spatial coordinates reaching a second preset number;

a second distance judging unit, used for judging whether distances of all the second spatial coordinates deviating from the spatial spherical surface being within a second maximum deviation distance range, if so, calculating a spherical center coordinate of the spatial spherical surface to obtain a position relationship matrix, if not, eliminating the second spatial coordinate with the largest deviation distance and returning to perform the second fitting unit;

a calibration unit, used for obtaining a hand-eye relationship matrix according to the pose relationship matrix and the position relationship matrix.

Optionally, the second point collecting unit is specifically used for:

deflecting the A-axis of the five-axis motion platform at the preset angle, and judging whether the calibration plate being within a visual field of the camera, if so, deflecting the C-axis of the five-axis motion platform for the plurality of times, and recording the second spatial coordinate of the corresponding calibration plate when deflecting the C-axis each time, if not, controlling the five-axis motion platform to perform a translation motion, moving the calibration plate back to the visual field of the camera, and calculating the second spatial coordinates of the calibration plate before moving according to a motion amount of the translation motion and the direction vectors of each translation axis.

Optionally, the second fitting unit is specifically used for:

judging whether the number of the second spatial coordinates reaching the second preset number, if not, returning to the step S9, and if so, fitting all the second spatial coordinates into the spatial spherical surface.

Optionally, the first fitting unit is specifically used for:

judging whether the number of the first spatial coordinate reaching the first preset number, if not, returning to the first point collecting unit, if so, fitting all the first spatial coordinates into the spatial straight line.

It may be seen from the above technical solution that the kinematics-free hand-eye calibration method and system provided in the present invention have the following advantages:

The kinematics-free hand-eye calibration method comprises the following steps of controlling translation axes of the five-axis motion platform to perform the single-axis point location motion, using the camera to obtain the first spatial coordinate of the calibration plate at the end of the five-axis motion platform, fitting all the obtained first spatial coordinates into a spatial straight line to obtain a unit direction vectors of the spatial straight line, carrying out Schmidt orthogonalization on the obtained unit direction vectors of the spatial straight lines of the X direction, the Y direction and the Z direction to obtain the pose relationship matrix combined by the orthogonalized direction vectors; obtaining the second spatial coordinate of the calibration plate in the mode of rotating the A-axis and the C-axis, fitting all second spatial coordinates into the spatial spherical surface, calculating the spherical center coordinate to obtain the position relationship matrix, and obtaining the hand-eye relationship matrix combined by the pose relationship matrix and the position relationship matrix. The overall hand-eye calibration process can solve the hand-eye relationship matrix simply, conveniently and accurately without the platform kinematics model, thus avoiding the error in solving the hand-eye relationship matrix due to the inaccurate platform kinematics model, and the technical problem is solved that the hand-eye calibration result is inaccurate due to the error between the theoretical platform end position-pose matrix calculated by the platform kinematics model and the actual platform end position-pose matrix in the hand-eye calibration mode with eyes outside the hand.

At the same time, the kinematics-free hand-eye calibration method provided in the present invention firstly obtains the direction vector of each translation axis in the camera coordinate system when solving the pose relationship matrix, and then obtains the pose relationship matrix by the Schmidt orthogonalization according to the direction vector, which may ensure that the five-axis motion platform can obtain an accurate third-order orthogonal matrix even if the axes are not completely vertical in the assembly process, and thus ensuring the reliability of the hand-eye calibration result.

Furthermore, the kinematics-free hand-eye calibration method provided in the present invention may indirectly solve the spatial position of the calibration plate in the camera coordinate system according to the obtained direction vectors of the translation axes when solving the pose relationship matrix, thus greatly broadening the motion range of the five-axis motion platform when performing hand-eye calibration.

Furthermore, the kinematics-free hand-eye calibration method provided in the present invention eliminates the data that deviate from the spatial straight line or deviate from the spatial spherical surface greatly, thus improving the accuracy of solving the hand-eye relationship matrix and further improving the accuracy of the hand-eye calibration result.

The kinematics-free hand-eye calibration system provided in the present invention is used for executing the kinematics-free hand-eye calibration method provided in the present invention, and the principle thereof and the obtained technical effect are the same as those of the kinematics-free hand-eye calibration method provided in The present invention, so the details are not repeated herein.

DESCRIPTION OF THE DRAWINGS

In order to more clearly explain the embodiments of the present invention or the technical solution in the prior art, the accompanying drawings needed in the description of the embodiments or the prior art will be briefly introduced hereinafter. Obviously, the accompanying drawings in the following description are only some embodiments of the present invention. For those having ordinary skills in the art, other related accompanying drawings may also be obtained according to these accompanying drawings without creative work.

DETAILED DESCRIPTION OF PREFERRED EMBODIMENTS

In order to make those people in the technical field better understand the solution of the present invention, the technical solution in the embodiment of the present invention will be described clearly and completely in conjunction with the accompanying drawings. Obviously, the described embodiment is only one part of the embodiments of the present invention, but not all embodiments. Based on the embodiments in the present invention, all other embodiments obtained by those having ordinary skills in the art without creative labor shall fall within the protecting scope of the present invention.

For the convenience of understanding, please referring to FIGS. 1A, 1B, 2A, 2B, and 3, the embodiment of the kinematics-free hand-eye calibration system is provided in the present invention, comprising the following steps.

Figure 1A:
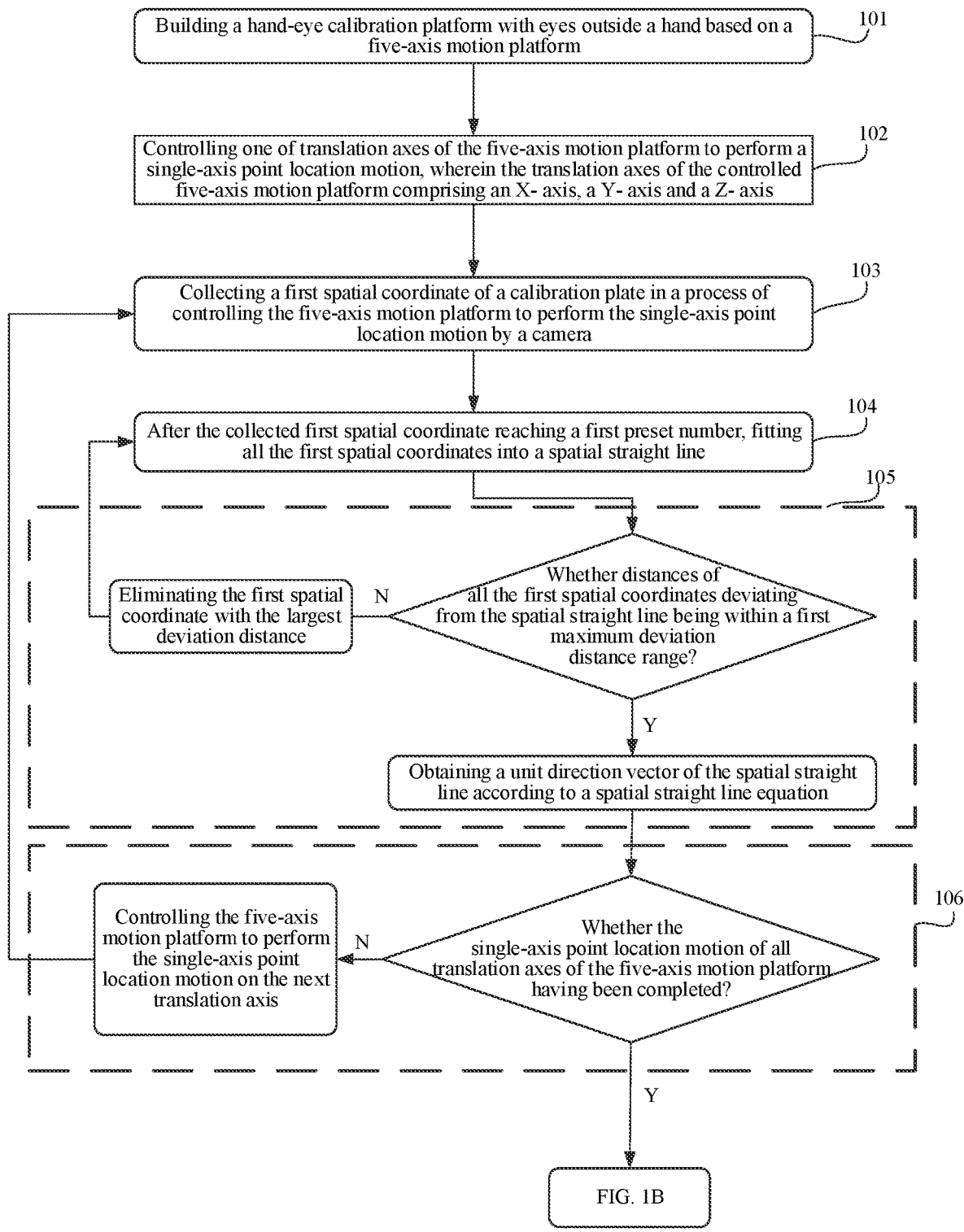
FIG. 1A and FIG. 1B in a combination show a schematic flow diagram of a kinematics-free hand-eye calibration method provided in the present invention.
Figure 1B:
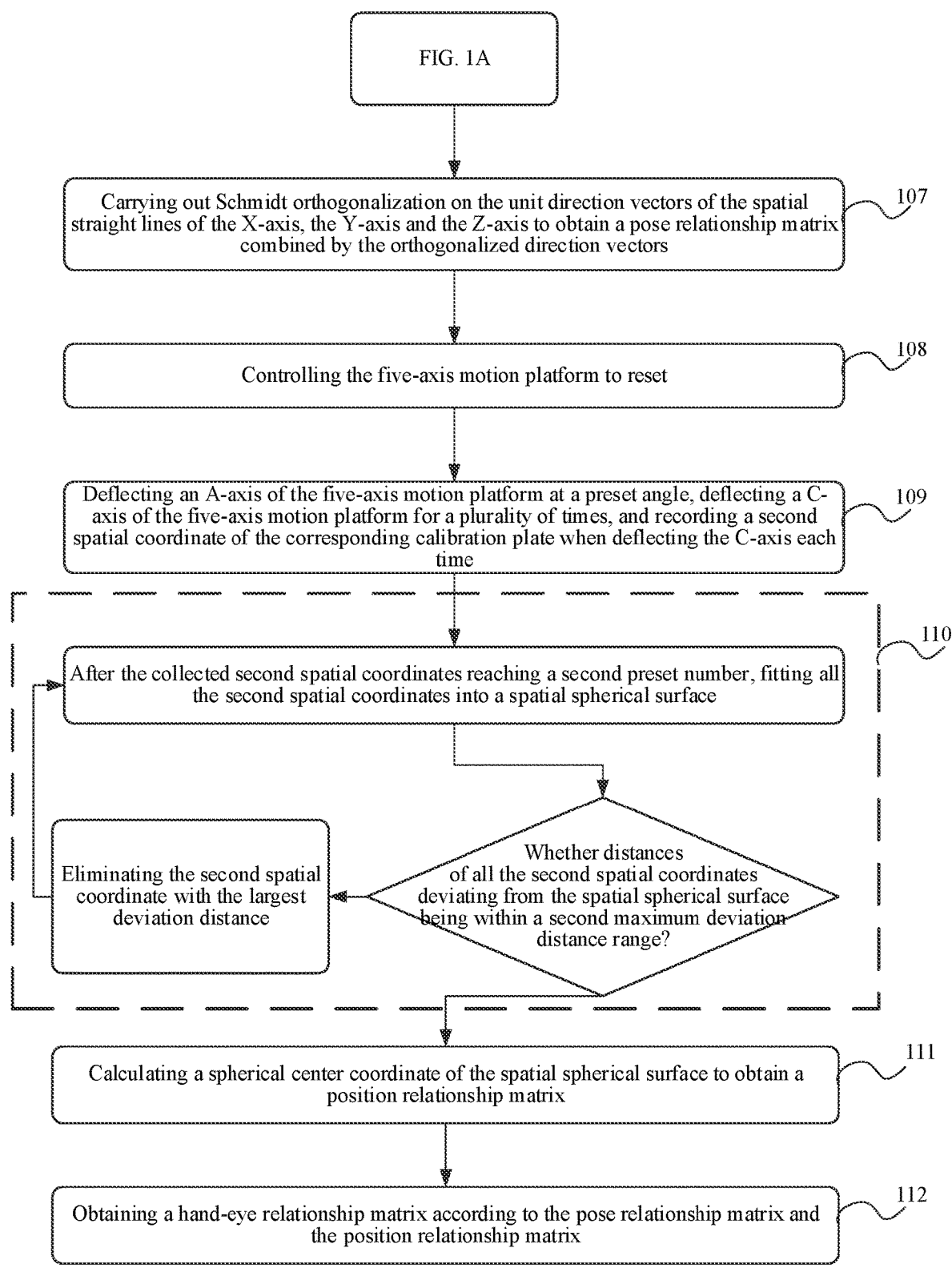
Figure 2A:
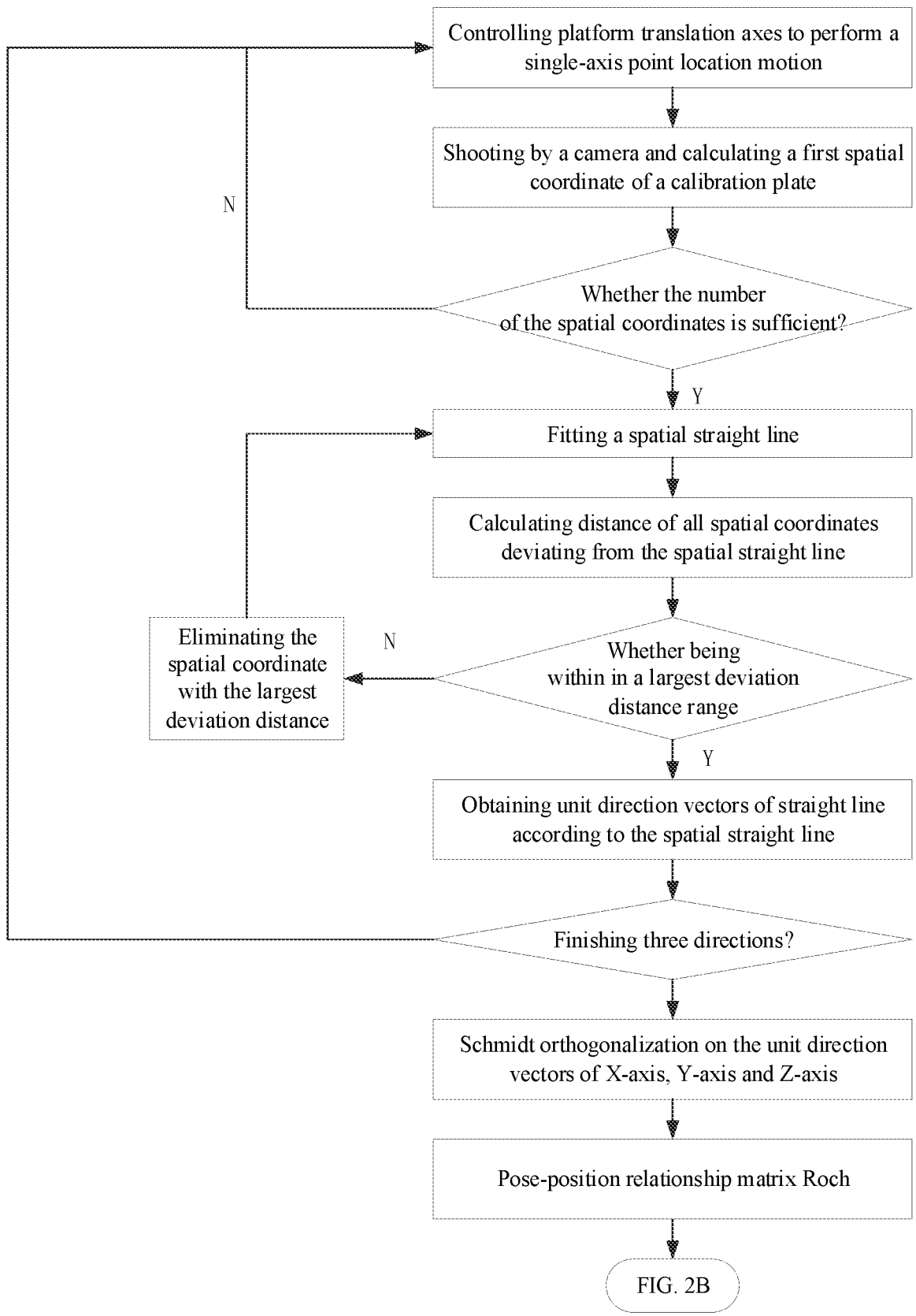
FIG. 2A and FIG. 2B in a combination show a logical block diagram of the kinematics-free hand-eye calibration method provided in the present invention.
Figure 2B:
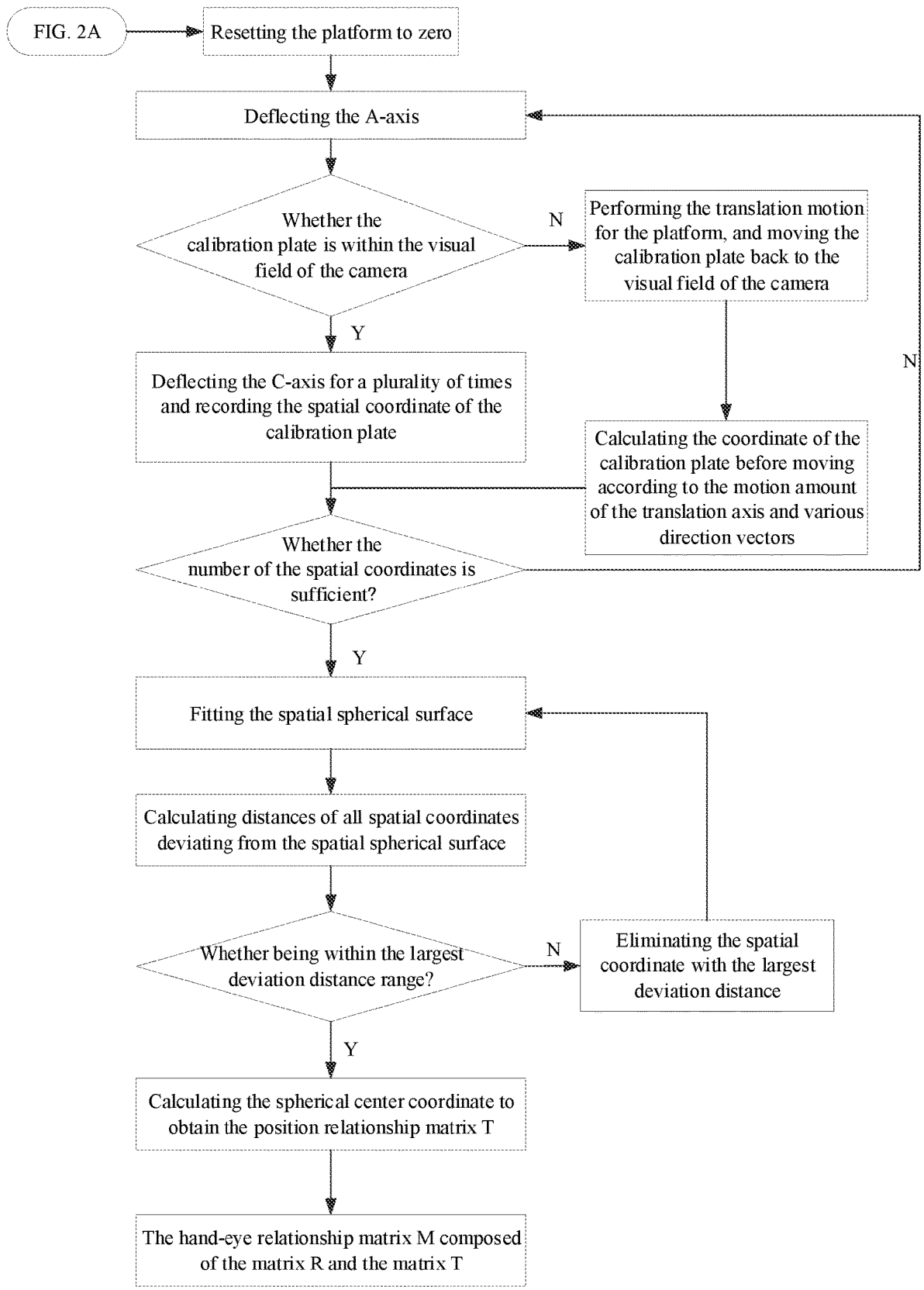
Figure 3:
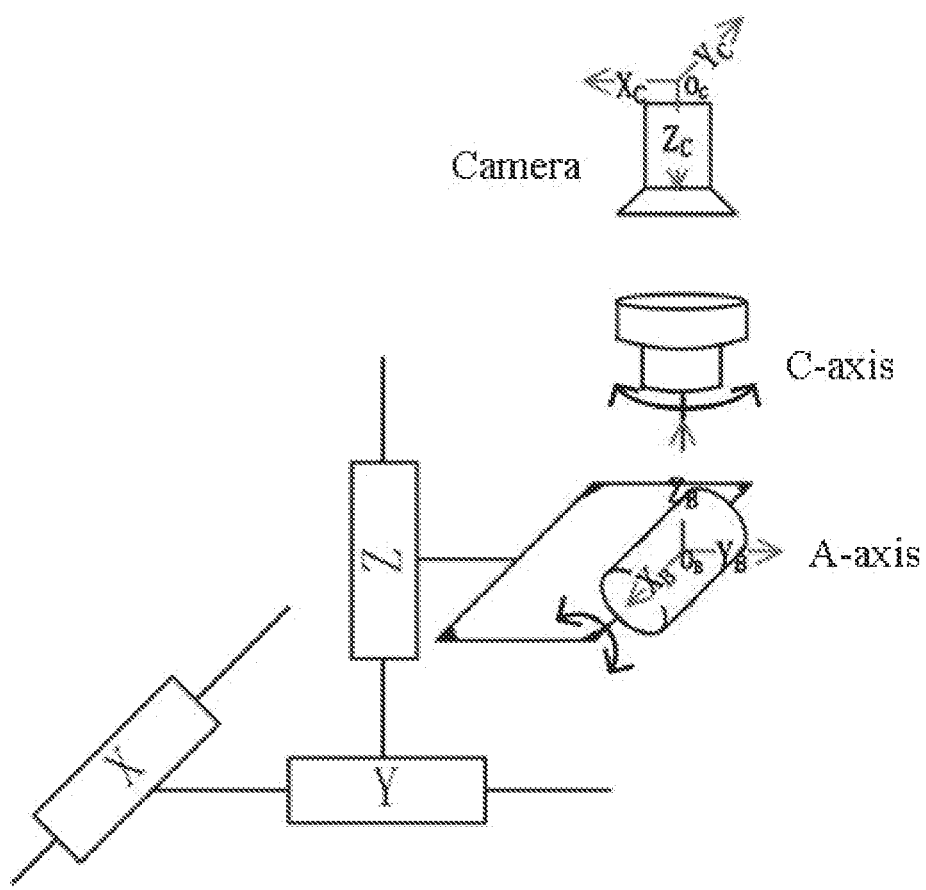
FIG. 3 is a structural diagram of a five-axis motion platform.

Step 101: building a hand-eye calibration platform with eyes outside a hand based on a five-axis motion platform;

It should be noted that, as shown in FIG. 3, the five axes of the five-axis motion platform are the X-axis, the Y-axis, the Z-axis, the A-axis and the C-axis respectively, the X-axis, the Y-axis and the Z-axis are the translation axes, and the A-axis and the C-axis are rotation axes. An original point $O_B$ of the base coordinate system of the five-axis motion platform is an intersection point of the rotation direction of the axis A and the rotation direction of the C-axis when the platform is in an initial position. The camera is mounted outside the platform. As seen from FIG. 3, the hand-eye relationship matrix to be obtained by the hand-eye calibration is the position-pose matrix from the camera coordinate system to the platform base coordinate system.

Step 102: controlling one of translation axes of the five-axis motion platform to perform a single-axis point location motion, wherein the translation axes of the controlled five-axis motion platform comprising an X-axis, a Y-axis and a Z-axis;

It should be noted that in the hand-eye calibration mode with eyes outside the hand, the camera is fixed outside a robotic arm, the camera and a base of the robotic arm are relatively stationary, and the calibration plate is placed on the C-axis at the end of the robotic arm. After building the hand-eye calibration platform, one of the translation axes (such as the X-axis) of the five-axis motion platform is controlled to perform the single-axis point location motion, which should ensuring that the calibration plate is always within the visual field of the camera.

Step 103: collecting a first spatial coordinate of a calibration plate in a process of controlling the five-axis motion platform to perform the single-axis point location motion by a camera;

It should be noted that after the moved translation axis moves to a measuring point every time, the camera shoots the calibration plate at this time to obtain a first spatial coordinate P(x,y,z) of the calibration plate in the camera coordinate system, and a plurality of first spatial coordinates $P_1, P_2, P_3 \ldots$ may be obtained after a plurality of acquisitions.

Step 104: after the collected first spatial coordinate reaching a first preset number, fitting all the first spatial coordinates into a spatial straight line;

It should be noted that when the number of the collected first spatial coordinates of the calibration plate is sufficient, all the first spatial coordinates are fitted into the spatial straight line, wherein the spatial straight line may be fitted by the least square method. If the number of the collected first spatial coordinates is insufficient, return to step 103 to control the five-axis motion platform to continue to perform the single-axis point location motion to obtain the sufficient number of the first spatial coordinates.

Step 105: judging whether distances of all the first spatial coordinates deviating from the spatial straight line being within a first maximum deviation distance range, if so, obtaining a unit direction vector of the spatial straight line according to a spatial straight line equation, if not, eliminating the first spatial coordinate with the largest deviation distance and returning to step 104;

It should be noted that after the spatial straight line is fitted, it is judged whether the distances of all the first spatial coordinates deviating from the spatial straight line are within the first maximum deviation distance range. If all the distances of all the first spatial coordinates deviating from the spatial straight line are within the first maximum deviation distance range, the unit direction vector $VX=[VX_X, VX_Y, VX_Z]$ of the spatial straight line is obtained according to the spatial straight line equation, VX refers to the numerical representation of the direction of the X-axis of the five-axis motion platform in the camera coordinate system, and in the same way, VY refers to the numerical representation of the direction of the Y-axis of the five-axis motion platform in the camera coordinate system, VZ refers to the numerical representation of the direction of the Z-axis of the five-axis motion platform in the camera coordinate system. If the distance of the first spatial coordinate deviating from the spatial straight line is not within the first maximum deviation distance range, a RANSAC method is adopted for eliminating the first spatial coordinate with the largest deviation distance and the step 104 is returned to re-fit the spatial straight line.

Step 106: judging whether the single-axis point location motion of all translation axes of the five-axis motion platform having been completed, if not, controlling the five-axis motion platform to perform the single-axis point location motion on the next translation axis, and returning to step S3, if so, executing step 107;

It should be noted that after calculating the unit direction vector of the spatial straight line on one translation axis, it is judged whether the single-axis point location motion of all the translation axes of the five-axis motion platform has been completed. If the calculation of the unit direction vector of the spatial straight line on the translation axis has not been completed, the five-axis motion platform is controlled to perform the single-axis point location motion on the next translation axis (if the X translation axis has been completed, then the next translation axis is the Y translation axis or the Z translation axis), and the steps 103 to 106 are returned to be executed again until all the translation axes calculate the unit direction vector of the spatial straight line. If the single-axis point location motion of all the translation axes of the five-axis motion platform has been completed, the step 107 is entered.

Step 107: carrying out Schmidt orthogonalization on the unit direction vectors of the spatial straight lines of the X-axis, the Y-axis and the Z-axis to obtain a pose relationship matrix combined by the orthogonalized direction vectors;

It should be noted that the initial pose relationship matrix $R'_{3\times3}$ may be built after obtaining the unit direction vectors of the spatial straight lines on the X-axis, the Y-axis and the Z-axis:

$$R'_{3\times3} = \begin{bmatrix} VX_X & VX_Y & VX_Z \\ VY_X & VY_Y & VY_Z \\ VZ_X & VZ_Y & VZ_Z \end{bmatrix}$$

The initial pose relationship matrix $R'_{3\times3}$ is completely combined together by the unit vectors of each translation axis.

An error exists in the actual assembly of the five-axis motion platform, which will lead to a situation that the translation axes are not completely perpendicular, so the obtained three unit direction vectors are not perpendicular to each other, which leads to the situation that $R'_{3\times3}$ is not the orthogonal matrix. In order to obtain the available pose relationship matrix $R_{3\times3}$, it is necessary to make Schmidt orthogonalization on the unit direction vectors of the spatial straight lines of the X-axis, the Y-axis and the Z-axis to obtain three mutually perpendicular unit direction vectors, so as to obtain the pose relationship matrix $R_{3\times3}$ composed of the orthogonalized direction vectors:

$$R_{3\times3} = \begin{bmatrix} VX'_X & VX'_Y & VX'_Z \\ VY'_X & VY'_Y & VY'_Z \\ VZ'_X & VZ'_Y & VZ'_Z \end{bmatrix}$$

wherein, $VX'=[VX'_X, VX'_Y, VX'_Z]$ refers to the X-axis unit direction vector obtained after Schmidt orthogonalization, $VY'=[VY'_X, VY'_Y, VY'_Z]$ refers to the Y-axis unit direction vector obtained after Schmidt orthogonalization, and $VZ'=[VZ'_X, VZ'_Y, VZ'_Z]$ refers to the Z-axis unit direction vector obtained after Schmidt orthogonalization.

Step 8: controlling the five-axis motion platform to reset;

It should be noted that after the pose relationship matrix is obtained, the five-axis motion platform is reset to zero, and the five-axis motion platform is in the initial position, and then the step 109 is executed.

Step 109: deflecting an A-axis of the five-axis motion platform at a preset angle, deflecting a C-axis of the five-axis motion platform for a plurality of times, and recording a second spatial coordinate of the corresponding calibration plate when deflecting the C-axis each time;

It should be noted that the A-axis of the five-axis motion platform is deflected at the preset angle, and the C-axis is deflected for point location motion for the plurality of times. Every time the C-axis moves to one measuring point, the camera shoots the calibration plate at this time and obtains the second spatial coordinate of the calibration plate in the camera coordinate system.

Figure 4:
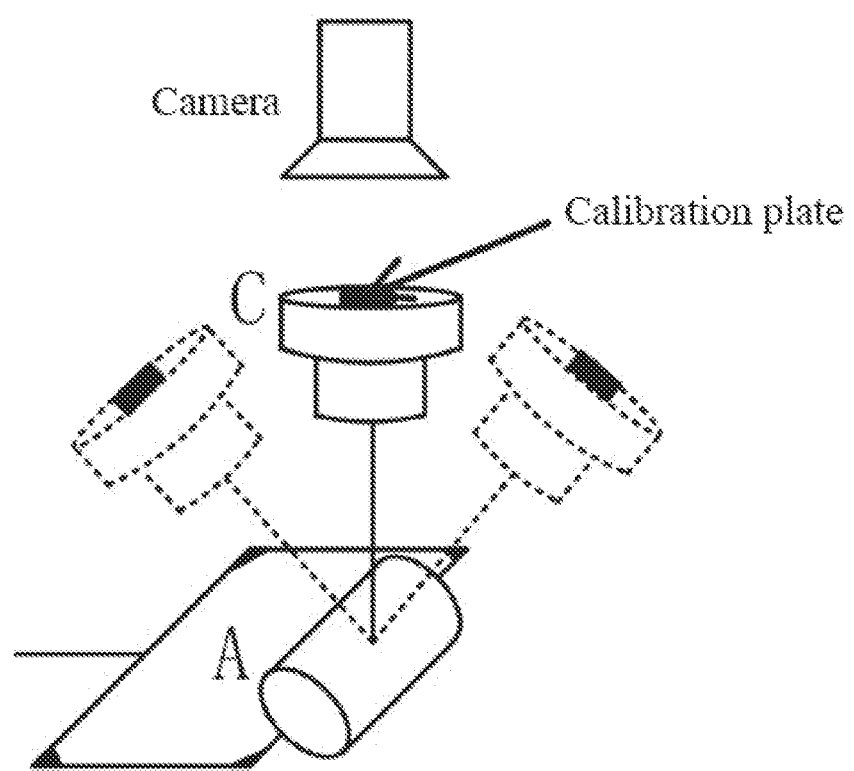
FIG. 4 is a schematic diagram of a calibration plate deflecting out of a view of a camera of provided in the present invention.

In one embodiment, the deflection of the A-axis may cause that the calibration plate deflects out of the visual field of the camera, as shown in FIG. 4. In order to avoid the result error due to the deflection of the calibration plate deviating out of the visual field of the camera, in step 109, after the A-axis of the five-axis motion platform is deflected at the preset angle, it is first judged whether the calibration plate is within the visual field of the camera. If so, the C-axis of the five-axis motion platform is deflected for the plurality of times, and the second spatial coordinate of the calibration plate corresponding to each deflection of the C-axis are recorded. If not, the five-axis motion platform is controlled to perform the translation motion, the calibration plate is moved back to the visual field of the camera, and the second spatial coordinate of the calibration plate is calculated according to the motion amount of the translation axis and the direction vector of each translation axis before moving. To be specific, the five-axis motion platform is controlled to perform the translation motion, and the spatial position $p(x,y,z)$ of the calibration plate in the camera coordinate system is obtained after the calibration plate is moved back to the visual field of the camera, and at the same time, the motion amounts $X_M$, $Y_M$ and $Z_M$ of each translation axis compared with the zero return point (initial position) are recorded. Obviously, the P coordinate at this time is not on the spatial spherical surface with the original point of the base coordinate system of the five-axis motion platform as the spherical center. Assuming that the spatial position of the calibration plate in the camera coordinate system is p', when the five-axis motion platform does not move, then $p'=p-X_M \cdot VX-Y_M \cdot VY-Z_M \cdot VZ$, obtaining:

$$p' = \begin{bmatrix} x' \\ y' \\ z' \end{bmatrix} = \begin{bmatrix} x - X_M \cdot VX_X - Y_M \cdot VY_X - Z_M \cdot VZ_X \\ y - X_M \cdot VX_Y - Y_M \cdot VY_Y - Z_M \cdot VZ_Y \\ z - X_M \cdot VX_Z - Y_M \cdot VY_Z - Z_M \cdot VZ_Z \end{bmatrix}$$

p' refers to a point on the spherical surface really to be solved. Replace p with p' at this time.

Step 110: after the collected second spatial coordinates reaching a second preset number, fitting all the second spatial coordinates into a spatial spherical surface.

It should be noted that if the number of the collected second spatial coordinates is sufficient, all the second spatial coordinates are directly fitted into the spatial spherical surface because all the second spatial coordinate points are on a spherical surface regarding the original point of the base coordinate system of the five-axis motion platform as the center, wherein all the second spatial coordinates will be fitted into the spatial spherical surface by the least square method. If the number of the collected second spatial coordinates is insufficient, the A-axis is deflected at a certain angle again, and the C-axis is deflected for the point location motion for the plurality of times. Every time the C-axis moves to one measuring point, the camera shoots the calibration plate at this time to obtain the second spatial coordinate of the calibration plate in the camera coordinate system. This is repeated until the sufficient number of the second spatial coordinates is obtained.

Step 111: judging whether distances of all the second spatial coordinates deviating from the spatial spherical surface being within a second maximum deviation distance range, if so, calculating a spherical center coordinate of the spatial spherical surface to obtain a position relationship matrix, if not, eliminating the second spatial coordinate with the largest deviation distance and returning to step 110.

It should be noted that after fitting the spatial spherical surface, it is judged whether the distances of all the second spatial coordinates deviating from the spatial spherical surface are within the second maximum deviation distance range. If all the distances of all the second spatial coordinates deviating from the spatial spherical surface are within the second maximum deviation distance range, the spherical center coordinate of the spatial spherical surface may be calculated, and the spherical center coordinate of the spatial spherical surface is the position relationship matrix $T_{3\times 1}$:

$$T_{3\times 1} = \begin{bmatrix} x_o \\ y_o \\ z_o \end{bmatrix}$$

wherein, $(x_0, y_0, z_0)$ refers to the spherical center coordinate of the spatial spherical surface.

If a situation exits that the distance of the second spatial coordinate deviating from the spatial spherical surface is not within the second maximum deviation distance range, the second spatial coordinate with the largest deviation distance is eliminated, and the step 110 is returned to re-fit the spatial spherical surface.

Step 112: obtaining a hand-eye relationship matrix according to the pose relationship matrix and the position relationship matrix.

It should be noted that the hand-eye calibration is actually to solve a fixed pose matrix $M_{4\times 4}$ between the camera coordinate system and the platform coordinate system, that is, the hand-eye relationship matrix. After the pose relationship matrix $R_{3\times 3}$ and the position relationship matrix $T_{3\times 1}$ are obtained, the hand-eye relationship matrix may be obtained:

$$M_{4\times 4} = \begin{bmatrix} R_{3\times 3} & T_{3\times 1} \\ 0 & 1 \end{bmatrix}$$

The kinematics-free hand-eye calibration method comprises the following steps of controlling translation axes of the five-axis motion platform to perform the single-axis point location motion, using the camera to obtain the first spatial coordinate of the calibration plate at the end of the five-axis motion platform, fitting all the obtained first spatial coordinates into a spatial straight line to obtain a unit direction vectors of the spatial straight line, carrying out Schmidt orthogonalization on the obtained unit direction vectors of the spatial straight lines of the X direction, the Y direction and the Z direction to obtain the pose relationship matrix combined by the orthogonalized direction vectors; obtaining the second spatial coordinate of the calibration plate in the mode of rotating the X-axis and the C-axis, fitting all second spatial coordinates into the spatial spherical surface, calculating the spherical center coordinate to obtain the position relationship matrix, and obtaining the hand-eye relationship matrix combined by the pose relationship matrix and the position relationship matrix. The overall hand-eye calibration process may solve the hand-eye relationship matrix simply, conveniently and accurately without the platform kinematics model, thus avoiding the error in solving the hand-eye relationship matrix due to the inaccurate platform kinematics model, and the technical problem is solved that the hand-eye calibration result is inaccurate due to the error between the theoretical platform end position-pose matrix calculated by the platform kinematics model and the actual platform end position-pose matrix in the hand-eye calibration mode with eyes outside the hand.

At the same time, the kinematics-free hand-eye calibration method provided in the present invention firstly obtains the direction vector of each translation axis in the camera coordinate system when solving the pose relationship matrix, and then obtains the pose relationship matrix by the Schmidt orthogonalization according to the direction vector, which may ensure that the five-axis motion platform can obtain an accurate third-order orthogonal matrix even if the axes are not completely vertical in the assembly process, and thus ensuring the reliability of the hand-eye calibration result.

Furthermore, the kinematics-free hand-eye calibration method provided in the present invention may indirectly solve the spatial position of the calibration plate in the camera coordinate system according to the obtained direction vectors of the translation axes when solving the pose relationship matrix, thus greatly broadening the motion range of the five-axis motion platform when performing hand-eye calibration.

Furthermore, the kinematics-free hand-eye calibration method provided in the present invention eliminates the data that deviate from the spatial straight line or deviate from the spatial spherical surface greatly, thus improving the accuracy of solving the hand-eye relationship matrix and further improving the accuracy of the hand-eye calibration result.

Figure 5:
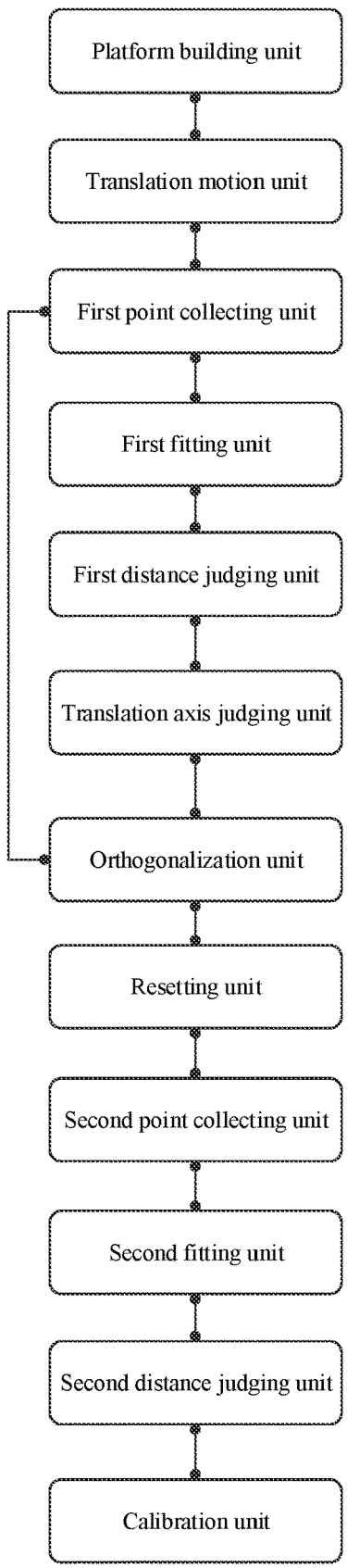
FIG. 5 is a schematic structural diagram of a kinematics-free hand-eye calibration system provided by the present invention.

For the convenience of understanding, please referring to FIG. 5, an embodiment of a kinematics-free hand-eye calibration system is provided in the present invention, comprising:

a platform building unit, used for building a hand-eye calibration platform with eyes outside a hand based on a five-axis motion platform;

a translation motion unit, used for controlling one of translation axes of the five-axis motion platform to perform a single-axis point location motion, wherein the translation axes of the controlled five-axis motion platform comprising an X-axis, a Y-axis and a Z-axis;

a first point collecting unit, used for collecting a first spatial coordinate of a calibration plate in a process of controlling the five-axis motion platform to perform the single-axis point location motion by a camera;

a first fitting unit, used for fitting all the first spatial coordinates into a spatial straight line after the collected first spatial coordinate reaching a first preset number;

a first distance judging unit, used for judging whether distances of all the first spatial coordinates deviating from the spatial straight line being within a first maximum deviation distance range, if so, obtaining a unit direction vector of the spatial straight line according to a spatial straight line equation, if not, eliminating the first spatial coordinate with the largest deviation distance and returning to perform the first fitting unit;

a translation shaft judging unit, used for judging whether the single-axis point location motion of all translation axes of the five-axis motion platform having been completed, if not, controlling the five-axis motion platform to perform the single-axis point location motion on the next translation axis, and returning to perform the first point collecting unit, if so, executing an orthogonalization unit;

the orthogonalization unit, used for carrying out Schmidt orthogonalization on the unit direction vectors of the spatial straight lines of the X-axis, the Y-axis and the Z-axis to obtain a pose relationship matrix combined by the orthogonalized direction vectors;

a resetting unit, used for controlling the five-axis motion platform to reset;

a second point collecting unit, used for deflecting an A-axis of the five-axis motion platform at a preset angle, deflecting a C-axis of the five-axis motion platform for a plurality of times, and recording a second spatial coordinate of the corresponding calibration plate when deflecting the C-axis each time;

a second fitting unit, used for fitting all the second spatial coordinates into a spatial spherical surface after the collected second spatial coordinates reaching a second preset number;

a second distance judging unit, used for judging whether distances of all the second spatial coordinates deviating from the spatial spherical surface being within a second maximum deviation distance range, if so, calculating a spherical center coordinate of the spatial spherical surface to obtain a position relationship matrix, if not, eliminating the second spatial coordinate with the largest deviation distance and returning to perform the second fitting unit;

a calibration unit, used for obtaining a hand-eye relationship matrix according to the pose relationship matrix and the position relationship matrix.

The second point collecting unit is specifically used for:

deflecting the A-axis of the five-axis motion platform at the preset angle, and judging whether the calibration plate being within a visual field of the camera, if so, deflecting the C-axis of the five-axis motion platform for the plurality of times, and recording the second spatial coordinate of the corresponding calibration plate when deflecting the C-axis each time, if not, controlling the five-axis motion platform to perform a translation motion, moving the calibration plate back to the visual field of the camera, and calculating the second spatial coordinates of the calibration plate before moving according to a motion amount of the translation motion and the direction vectors of each translation axis.

The second fitting unit is specifically used for:

judging whether the number of the second spatial coordinates reaching the second preset number, if not, returning to the step S9; and if so, fitting all the second spatial coordinates into the spatial spherical surface.

The first fitting unit is specifically used for:

judging whether the number of the first spatial coordinate reaching the first preset number, if not, returning to the first point collecting unit, if so, fitting all the first spatial coordinates into the spatial straight line.

The hand-eye relationship matrix is $$M_{4\times4} = \begin{bmatrix} R_{3\times3} & T_{3\times1} \\ 0 & 1 \end{bmatrix}$$

wherein $M_{4\times4}$ is the hand-eye relationship matrix, $R_{3\times3}$ is the pose relationship matrix, and $T_{3\times1}$ is the position relationship matrix.

The kinematics-free hand-eye calibration system provided in the present invention is used for executing the kinematics-free hand-eye calibration method provided in the present invention, and the principle thereof and the obtained technical effect are the same as those of the kinematics-free hand-eye calibration method provided in the present invention, so the details are not repeated herein.

The terms "first", "second", "third", "fourth" and the like (if any) in the description of the present invention and the above accompanying drawings are used for distinguishing similar objects, and are not necessarily used for describing a specific order or sequence. It should be understood that the data used in such way may be interchanged under an appropriate circumstance, so that the embodiments of the present invention described herein may be implemented in other orders than those illustrated or described herein, for example. Furthermore, the terms "comprising" and "having" and any variations thereof are intended to cover non-exclusive inclusion, for example, a process, a method, a system, a product or equipment that comprising a series of steps or units are not necessarily limited to those explicitly listed, but may comprise other steps or units not explicitly listed or inherent to such processes, methods, products or equipment.

As mentioned above, the above embodiments are only used for illustrating the technical solution of the present invention, but not to limit the technical solution. Although the present invention has been described in detail with reference to the foregoing embodiments, those having ordinary skills in the art should understand that the technical solution recorded in the foregoing embodiments may also be modified, or part of technical features may be replaced with equivalents. However, these modifications or substitutions do not make the essence of the corresponding technical solutions deviate from the spirit and scope of the technical solutions of various embodiments of the present invention.

We claim:

1. A kinematics-free hand-eye calibration method, comprising the following steps of:
   S1: building a hand-eye calibration platform with eyes outside a hand based on a five-axis motion platform;
   S2: controlling one of translation axes of the five-axis motion platform to perform a single-axis point location motion, wherein the translation axes of the controlled five-axis motion platform comprising an X-axis, a Y-axis and a Z-axis;
   S3: collecting a first spatial coordinate of a calibration plate in a process of controlling the five-axis motion platform to perform the single-axis point location motion by a camera;
   S4: after the collected first spatial coordinate reaching a first preset number, fitting all the first spatial coordinates into a spatial straight line;
   S5: judging whether distances of all the first spatial coordinates deviating from the spatial straight line being within a first maximum deviation distance range, if so, obtaining a unit direction vector of the spatial straight line according to a spatial straight line equation, if not, eliminating the first spatial coordinate with the largest deviation distance and returning to step S4;
   S6: judging whether the single-axis point location motion of all translation axes of the five-axis motion platform having been completed, if not, controlling the five-axis motion platform to perform the single-axis point location motion on the next translation axis and returning to step S3; if so, executing step S7;
   S7: carrying out Schmidt orthogonalization on the unit direction vectors of the spatial straight lines of the X-axis, the Y-axis and the Z-axis to obtain a pose relationship matrix combined by the orthogonalized direction vectors;
   S8: controlling the five-axis motion platform to reset;
   S9: deflecting an A-axis of the five-axis motion platform at a preset angle, deflecting a C-axis of the five-axis motion platform for a plurality of times, and recording a second spatial coordinate of the corresponding calibration plate when deflecting the C-axis each time;
   S10: after the collected second spatial coordinates reaching a second preset number, fitting all the second spatial coordinates into a spatial spherical surface;
   S11: judging whether distances of all the second spatial coordinates deviating from the spatial spherical surface being within a second maximum deviation distance range, if so, calculating a spherical center coordinate of the spatial spherical surface to obtain a position relationship matrix, if not, eliminating the second spatial coordinate with the largest deviation distance and returning to step S10; and
   S12: obtaining a hand-eye relationship matrix according to the pose relationship matrix and the position relationship matrix.

2. The kinematics-free hand-eye calibration method according to claim 1, wherein the step S9 specifically comprises:
   deflecting the A-axis of the five-axis motion platform at the preset angle, and judging whether the calibration plate being within a visual field of the camera, if so, deflecting the C-axis of the five-axis motion platform for the plurality of times, and recording the second spatial coordinate of the corresponding calibration plate when deflecting the C-axis each time, if not, controlling the five-axis motion platform to perform a translation motion, moving the calibration plate back to the visual field of the camera, and calculating the second spatial coordinates of the calibration plate before moving according to a motion amount of the translation motion and the direction vectors of each translation axis.

3. The kinematics-free hand-eye calibration method according to claim 2, wherein the step S10 specifically comprises:
   judging whether the number of the second spatial coordinates reaching the second preset number, if not, returning to the step S9, and if so, fitting all the second spatial coordinates into the spatial spherical surface.

4. The kinematics-free hand-eye calibration method according to claim 1, wherein the step S4 specifically comprises:
   judging whether the number of the first spatial coordinate reaching the first preset number, if not, returning to step S3; if so, fitting all the first spatial coordinates into the spatial straight line.

5. The kinematics-free hand-eye calibration method according to claim 1, wherein the hand-eye relationship matrix is $$M_{4\times 4} = \begin{bmatrix} R_{3\times 3} & T_{3\times 1} \\ 0 & 1 \end{bmatrix}$$

wherein $M_{4\times 4}$ is the hand-eye relationship matrix, $R_{3\times 3}$ is the pose relationship matrix, and $T_{3\times 1}$ is the position relationship matrix.

6. The kinematics-free hand-eye calibration method according to claim 1, wherein, in the step S4, a least square method is used to fit all the first spatial coordinates into the spatial straight line, and in the step S10, the least square method is used to fit all the second spatial coordinates into the spatial spherical surface.

7. A kinematics-free hand-eye calibration system, comprising:

a platform building unit, used for building a hand-eye calibration platform with eyes outside a hand based on a five-axis motion platform;

a translation motion unit, used for controlling one of translation axes of the five-axis motion platform to perform a single-axis point location motion, wherein the translation axes of the controlled five-axis motion platform comprising an X-axis, a Y-axis and a Z-axis;

a first point collecting unit, used for collecting a first spatial coordinate of a calibration plate in a process of controlling the five-axis motion platform to perform the single-axis point location motion by a camera;

a first fitting unit, used for fitting all the first spatial coordinates into a spatial straight line after the collected first spatial coordinate reaching a first preset number;

a first distance judging unit, used for judging whether distances of all the first spatial coordinates deviating from the spatial straight line being within a first maximum deviation distance range, if so, obtaining a unit direction vector of the spatial straight line according to a spatial straight line equation, if not, eliminating the first spatial coordinate with the largest deviation distance and returning to perform the first fitting unit;

a translation shaft judging unit, used for judging whether the single-axis point location motion of all translation axes of the five-axis motion platform having been completed, if not, controlling the five-axis motion platform to perform the single-axis point location motion on the next translation axis, and returning to perform the first point collecting unit, if so, executing an orthogonalization unit;

the orthogonalization unit, used for carrying out Schmidt orthogonalization on the unit direction vectors of the spatial straight lines of the X-axis, the Y-axis and the Z-axis to obtain a pose relationship matrix combined by the orthogonalized direction vectors;

a resetting unit, used for controlling the five-axis motion platform to reset;

a second point collecting unit, used for deflecting an A-axis of the five-axis motion platform at a preset angle, deflecting a C-axis of the five-axis motion platform for a plurality of times, and recording a second spatial coordinate of the corresponding calibration plate when deflecting the C-axis each time;

a second fitting unit, used for fitting all the second spatial coordinates into a spatial spherical surface after the collected second spatial coordinates reaching a second preset number;

a second distance judging unit, used for judging whether distances of all the second spatial coordinates deviating from the spatial spherical surface being within a second maximum deviation distance range, if so, calculating a spherical center coordinate of the spatial spherical surface to obtain a position relationship matrix, if not, eliminating the second spatial coordinate with the largest deviation distance and returning to perform the second fitting unit; and a calibration unit, used for obtaining a hand-eye relationship matrix according to the pose relationship matrix and the position relationship matrix.

8. The kinematics-free hand-eye calibration system according to claim 7, wherein the second point collecting unit is specifically used for:

deflecting the A-axis of the five-axis motion platform at the preset angle, and judging whether the calibration plate being within a visual field of the camera, if so, deflecting the C-axis of the five-axis motion platform for the plurality of times, and recording the second spatial coordinate of the corresponding calibration plate when deflecting the C-axis each time, if not, controlling the five-axis motion platform to perform a translation motion, moving the calibration plate back to the visual field of the camera, and calculating the second spatial coordinates of the calibration plate before moving according to a motion amount of the translation motion and the direction vectors of each translation axis.

9. The kinematics-free hand-eye calibration system according to claim 8, wherein the second fitting unit is specifically used for:

judging whether the number of the second spatial coordinates reaching the second preset number, if not, returning to the step S9, and if so, fitting all the second spatial coordinates into the spatial spherical surface.

10. The kinematics-free hand-eye calibration system according to claim 7, wherein the first fitting unit is specifically used for:

judging whether the number of the first spatial coordinate reaching the first preset number, if not, returning to the first point collecting unit, if so, fitting all the first spatial coordinates into the spatial straight line.

* * * * *